May 29, 1956     H. F. BURTON     2,747,435
APPARATUS FOR AND METHOD OF MANUFACTURING HOLE SAWS
Filed Dec. 6, 1954     5 Sheets-Sheet 1

INVENTOR.
HOWARD F. BURTON
BY Golrick + Golrick
ATTORNEYS

May 29, 1956     H. F. BURTON     2,747,435
APPARATUS FOR AND METHOD OF MANUFACTURING HOLE SAWS
Filed Dec. 6, 1954     5 Sheets-Sheet 2
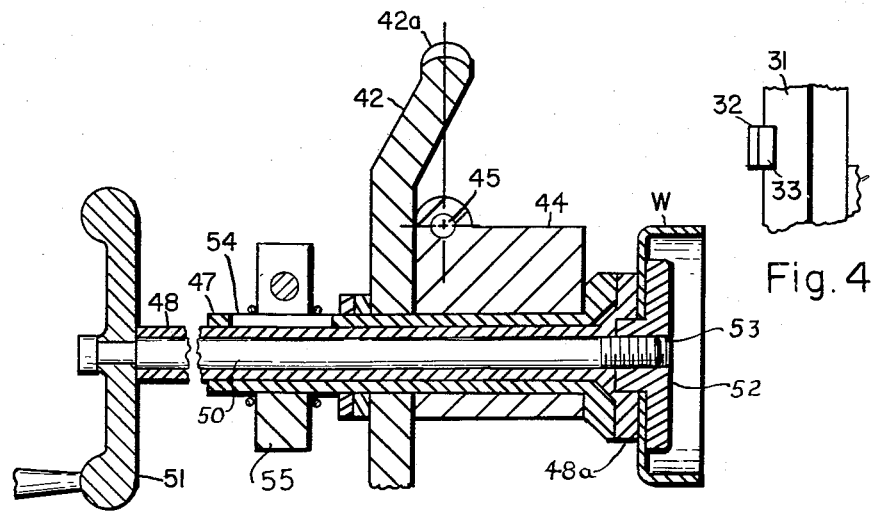
Fig. 2
Fig. 4
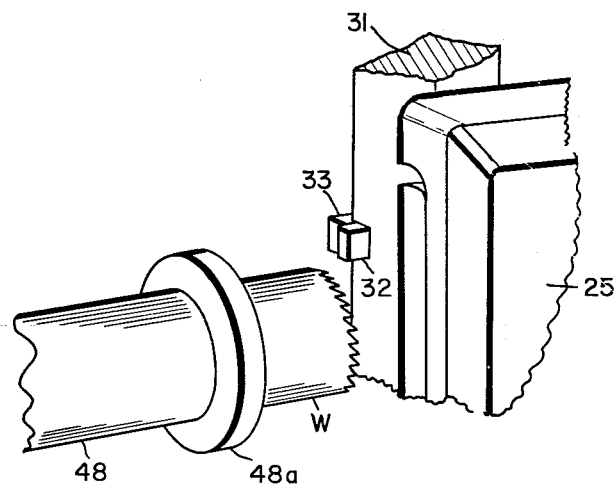
Fig. 3
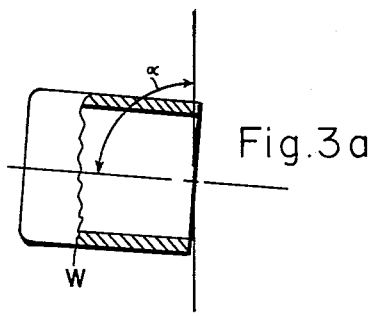
Fig. 3a
INVENTOR.
HOWARD F. BURTON
BY Golrick + Golrick
ATTORNEYS INVENTOR.
HOWARD F. BURTON
BY Golrick + Golrick
ATTORNEYS May 29, 1956  H. F. BURTON  2,747,435
APPARATUS FOR AND METHOD OF MANUFACTURING HOLE SAWS
Filed Dec. 6, 1954  5 Sheets-Sheet 4

NORMAL POSITION OF HOLE SAW, ARBOR ASSEMBLY, & GEAR

POSITION OF HOLE SAW, ARBOR ASSEMBLY, & GEAR WHEN CUTTING ON DOWN STROKE OF PUNCH

POSITION OF HOLE SAW, ARBOR ASSEMBLY, & GEAR WHEN CUTTING ON UP STROKE OF PUNCH

*INVENTOR.*
HOWARD F. BURTON
BY
*Gobrick + Gobrick*
ATTORNEYS

May 29, 1956  H. F. BURTON  2,747,435
APPARATUS FOR AND METHOD OF MANUFACTURING HOLE SAWS
Filed Dec. 6, 1954  5 Sheets-Sheet 5
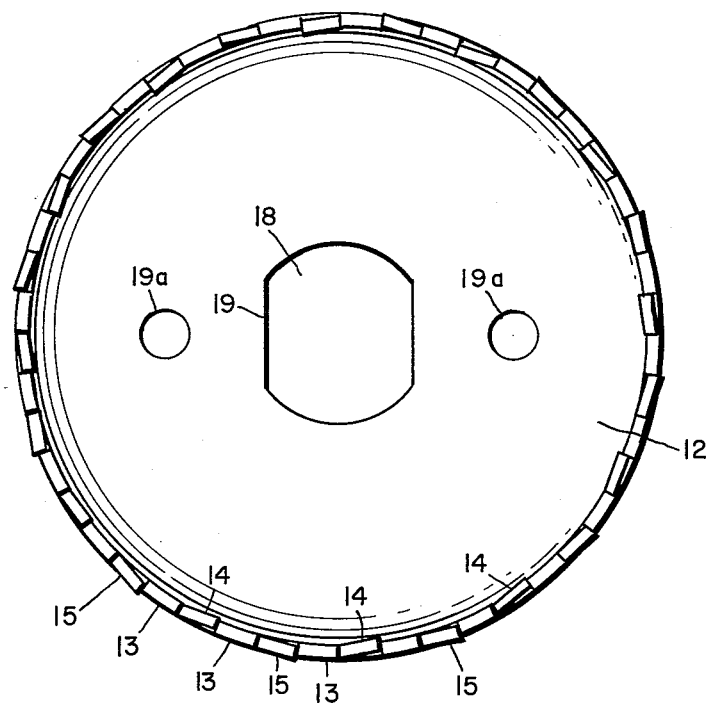
Fig. II
INVENTOR.
HOWARD F. BURTON
BY Golrick + Golrick
ATTORNEYS United States Patent Office 2,747,435
Patented May 29, 1956

2,747,435

APPARATUS FOR AND METHOD OF MANUFACTURING HOLE SAWS

Howard F. Burton, Towson, Md., assignor to The Black & Decker Manufacturing Company, Towson, Md., a corporation of Maryland Application December 6, 1954, Serial No. 473,155

13 Claims. (Cl. 76—29)

This invention is directed to means and methods for the production of cutting tools and the disclosure hereinafter set forth shows the adaption of the same to the manufacture of cylindrical hole saws of uniform high quality which will cut holes in non-hardened ferrous and non-ferrous metals, wood, plastics and like materials.

The general object of the invention is to provide a novel method of forming the cutting teeth of a saw whereby single teeth or groups of cutting teeth may be upset in the same operation in which the teeth are formed.

More specifically the invention is directed to the provision of a reciprocating press and die mechanism which will form and upset a saw tooth or teeth upon a downward and an upward stroke of the press ram thereby effecting an inward and outward upsetting of the teeth thus formed.

Another object of the present invention is the provision of automatically operated means associated with the press mechanism for indexing a work blank intermediate the downward and the upward stroke of the press ram whereby a tooth forming operation may be performed upon the work piece during a downward stroke of the ram and likewise upon an upward stroke of the ram.

A further object of the present invention is the provision of a floatable work blank holding means which is selectably indexable while supporting the work blank in juxtaposition to the punch and die mechanism.

A still further object is the provision of an inner and outer die structure coactive with a two-way acting shearing punch which cooperates with the dies alternately in performing work on a work blank.

A further object of the invention is the provision of a mechanism for fulfilling the above stated objects which will be completely automatic in producing completed work pieces.

In the drawings Fig. 1 is a perspective view of my apparatus for automatically forming hole saw teeth with the press parts shown in phantom by dot and dash lines, certain parts of the press being omitted for clarity;

Fig. 2 is a fragmentary cross sectional elevation of an indexable work blank holding means;

Fig. 3 is a perspective view of the punch and work holding means with a completed work piece thereon;

Fig. 3A is a diagrammatic representation of one use of the apparatus;

Fig. 4 is a fragmentary elevation of the punch and holder therefor;

Fig. 11 is a saw tooth end view of a large hole saw.

Figure 1:
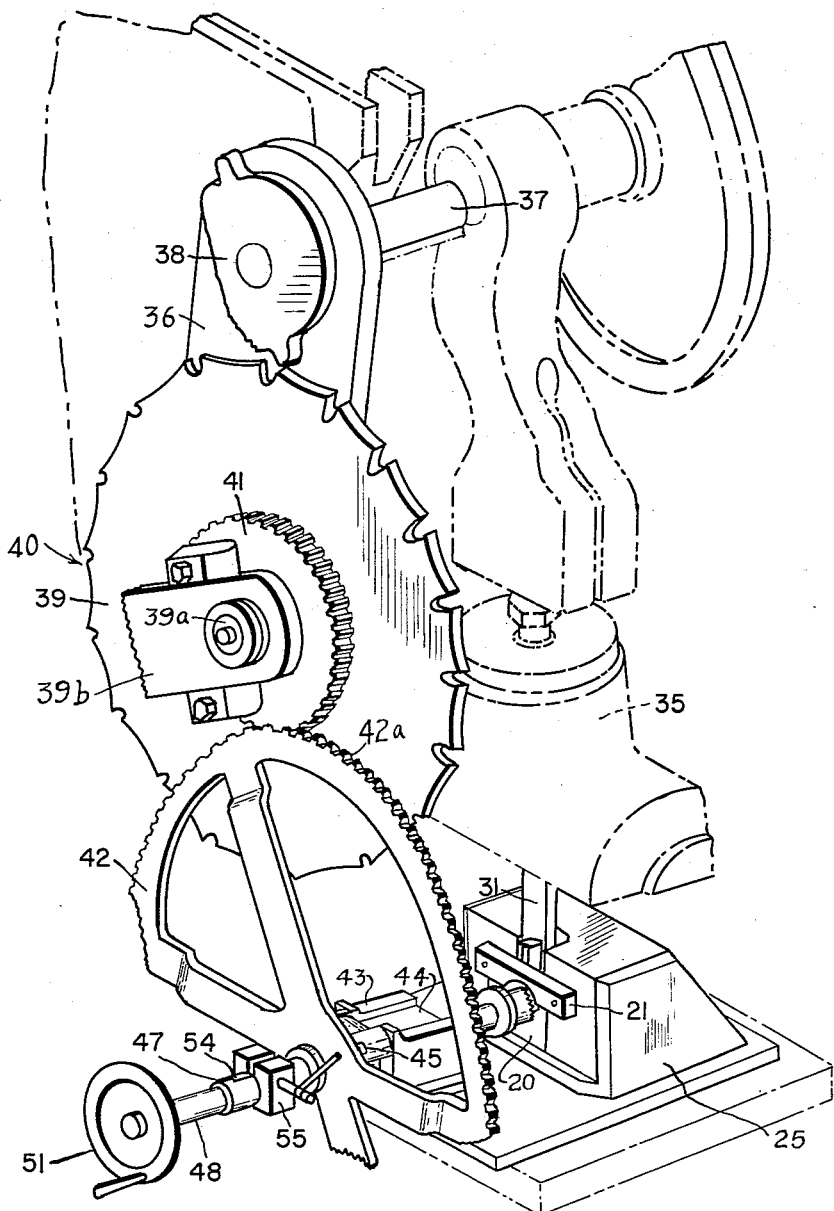

Hole saws comprise hollow cylinders of outside diameter corresponding to the size of the hole to be cut in wood, plaster or fiber board, soft marble, non-hardened metals, etc. The cylinder usually is a drawn cup with arbor attachment provision at the bottom of the cup and the cutting teeth are formed at the opposite or open end of the cylinder. Hole saws of from three-quarter inch to four inch diameter, which have found use in many industrial environments, depreciate more or less rapidly, but the work performed as compared with that attained by other methods justifies the use of the hole saw.

To prevent friction heating or burning of the hole saw and for ease of removal of the cut core from the saw, the teeth must be offset or upset so that the circular groove being cut to remove a core will have a greater width than the thickness of the cylinder wall. The present invention contemplates the provision of a method of shear forming the saw teeth while offsetting the teeth in a novel alternate fashion and the provision of mechanism for fulfilling the method automatically.

The mechanism comprises essentially an inner and an outer die structure associated with a two-way acting punch, the latter acting alternately with the inner and the outer die structures in one cycle of operation of a crank operated punch ram. The cylindrical work blanks are presented to the dies and punch by a rockable indexing blank holding means, the associated indexing means serving to index the work blank twice during each full cycle of operation of the punch ram. The blank holding means is such that the work blank can float or shift vertically in direction of punching relative to the outer and inner dies thereby to preserve the upset formation of the saw teeth when the completed work is removed from between the dies; and also in the case of small diameter work-pieces to provide punch clearance.

The apparatus of the invention is shown in the drawings as being adaptable to a single crank gap frame press, but it will be apparent from the following description thereof that the method and apparatus can be adapted to other types of presses.

The order of offsetting the teeth varies according to the diameter of the saw being formed. In the large diameters a straight tooth is formed intermediate alternately inward and outward offset teeth as shown in Fig. 11. In the smaller diameters the teeth are all offset alternately inwardly and outwardly.

Figure 5:
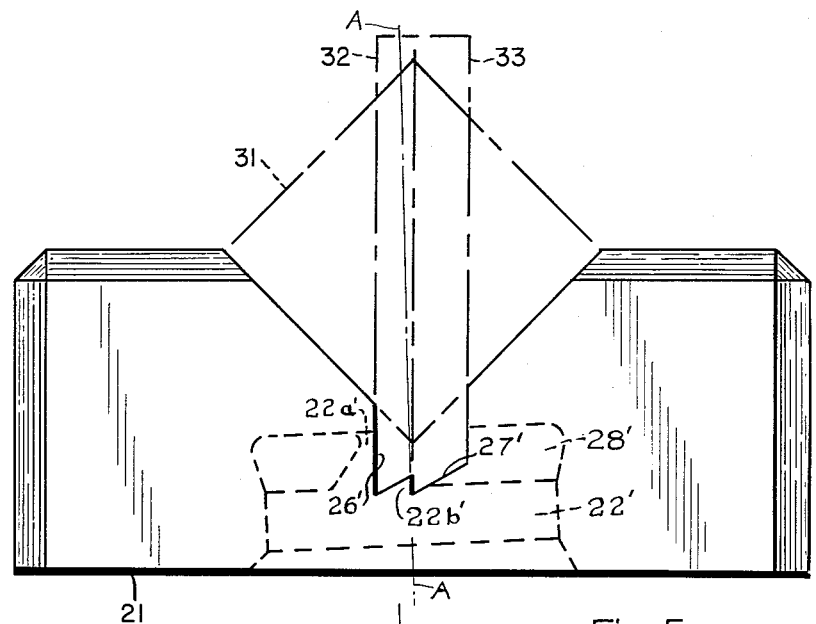
Fig. 5 is a top view of a nest type die comprising the outer or upper die structure.
Figure 6:
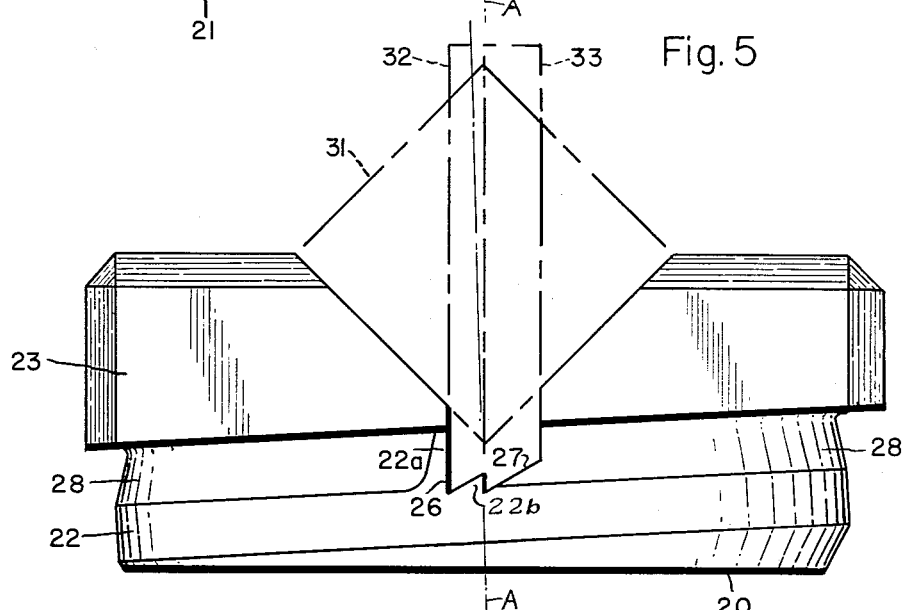
Fig. 6 is a top view of a horn type die comprising the inner or lower die structure.

By reference to the completed saw blank shown in Fig. 11, it will be seen that intermediate teeth 13 are not offset while teeth 14 are offset inwardly and teeth 15 are offset outwardly. The end wall of the blank 12 has an opening 18 with parallel constricted walls 19 which serve as a key on the arbor to which the cup is attached when in use. Such arbors also have screws or pins fitting holes 19a for securing the saw on the arbor. The teeth are formed in the end of the blank at the top region thereof as viewed in Fig. 11, and the blank cylinder rests upon an annular land 22 of the inner lower die 20 (Fig. 6). The upper or outer die 21 (Fig. 5) is rectangular in shape and rests upon a formation 23 of the inner lower die mechanism and the two die structures are supported by a die holder structure 25 which rests upon the press bolster plate (not shown).

Figure 7:
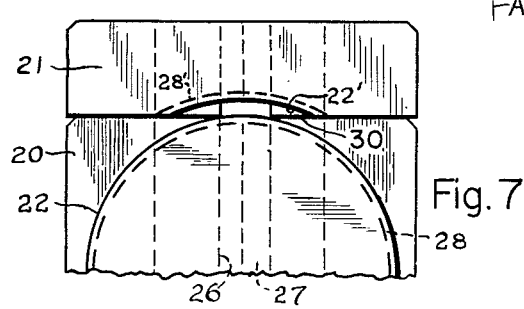
Fig. 7 is a front elevation diagrammatically showing the arcuate relationship of the dies.

By reference to Fig. 7 is will be noted that a substantial arcuate space 30 is provided between the arcuate shearing faces of the dies, which space should exceed the overall thickness of the saw teeth when offset inwardly and outwardly. This permits withdrawal of the formed teeth from between the die structures without deforming the offset teeth of the work.

As shown in Figs. 6 and 7, the dies are constructed for the formation of two teeth on each upward and each downward punch stroke with one only of the pair of teeth being offset and the other remaining straight. Referring to Fig. 6, it will be noted that a left shearing edge 26 is formed on a small land 22a which is part of the cylindrical land 22, and the tooth shaped projection 22b is likewise part of the same cylindrical surface. Hence the tooth portion of the blank on the projecting land 22a and the full tooth on 22b remain straight when shear formed by the downstroke of the punch. On the other hand the shearing edge 27 is formed in the downwardly beveled or conical surface 28 of the die structure 20, so that the metal to the right of edge 27 is deformed by a downstroke to an inward offset against the male conical or beveled surface 28 as the full straight tooth on 22b is being shear formed. The blank is indexed, in a manner to be described, the space of two teeth from left to right of Figs. 5, 6 and 7 after the punch clears the blank path.

The shearing edges on the concave recessed portion of the die 21 are substantially the same as those described in reference to the convex areas of die 20 in Fig. 6, with portions of the oppositely curved areas of the upper die corresponding to those of the lower die indicated by like numerals primed. Hence after a downward stroke, the aforementioned indexing of the blank by two tooth spaces brings an unsheared area of the blank under female cylindrical areas 22a', 22b' and under part of the female beveled or conical area bounded by edge 27'. This rotational index motion therefore brings that sheared blank edge formed upon the straight edge 26 of the cylindrical land projection 22 on the lower die during the preceeding downward punch stroke (i. e., the trailing edge of the portion sheared on the previous downstroke) under the oblique edge 27'. Upon the upstroke, the top edges of the punch, corresponding in position to those described for the lower punch, perform an analogous shearing with the formation of one complete straight tooth on 22b', and a resulting completion and outward offset of the other tooth against conical surface 28', of the pair thus formed. After the punch clears the blank on the upward stroke, again the blank is indexed two tooth spaces, so that the trailing edge of the portion sheared on the upstroke, (i. e., the edge sheared on straight edge 26' of cylindrical land projection 22a' on the upper die) is brought over edge 27 on the male beveled portion of the lower die, for an ensuing downstroke continuing the punching cycle.

In summary then, for the die and punch form shown and with corresponding two tooth space indexing intervening between punch strokes in opposite directions, on each stroke one straight tooth is instantaneously completely sheared and formed on 22b (or 22b'); the forward cutting edge of another tooth is formed on the edge 26 (or 26') without offset at the left of the die; and at the right side of the die on the slanting edge 27 of conical surface 28 (or edge 27' of surface 28'), by shearing the back edge thereof there is completed a tooth of which the forward edge had been sheared on the immediately preceeding opposite stroke.

The punch mechanism comprises a holder 31 square in cross section, through which extend the individual punch members 32 and 33. The die members are shaped to saddle the punch holder as indicated by the dot and dash lines in Figs. 5 and 6. The punch holder 31 is mounted in the head 35 of the ram mechanism of the press and is adjustable therein.

The indexing mechanism for indexing the work blank supporting spindle mechanism generally indicated by the reference numeral 40 in Fig. 1 will now be described. A work holder spindle 48 is slidable toward and away from the punch and die mechanism. Actuation of the work holder is taken from the crank shaft 37 of the press by a Geneva motion means comprising a two-tooth pinion 38 mounted on an outer end of the crankshaft outboard of the upper end of support arm 36 fixed on and dependent from a portion of the press frame, and a Geneva gear disk 39 rotatably supported by a stud shaft 39a on the lower end of arm 36. Thus the disk 39 is indexed twice during each full revolution of the crank shaft i. e. during a full cycle of movement of the punch ram. Mounted co-axial with and fixed to the disk 39 is a change gear 41, which meshes with an indexing gear 42 co-axial with the spindle mechanism. A second arm 39b with rearward end secured at a suitable location (not shown) on the press frame extends forwardly to provide additional support for the indexing mechanism by carrying at its forward end the outboard end of stud shaft 39a. Gears 41 and 42 are a changeable train, there being a specific train for each desired number of teeth to be formed on a blank circumference. For example, like size teeth on blanks of different diameters, or various tooth sizes on blanks of like diameter, would be cases of different numbers of teeth requiring different trains; whereas in forming a like number of teeth on blanks of different diameters the same train would be used, though the difference in blank diameters or in tooth size would require a change in dies.

The rockable spindle mechanism or arbor assembly will now be described, referring to Figs. 2, 8, 9 and 10. As previously mentioned, the work blank supporting spindle 48 is rockable about a horizontal axis to permit the work blank to oscillate between the upper and the lower dies 21 and 20 respectively. To this end the entire spindle mechanism is supported on a pin 45 carried by a bracket 43 supported on the bolster plate of the press. The bracket straddles a hinge block 44 journalling a spindle tube 47 upon which the indexing gear 42 is removably secured, with the tube 47 and gear 42 axially fixed relative to block 44. The spindle proper is the tube 48 slidable within tube 47 and having a draw rod 50 disposed therein. The work blank W (see Fig. 2) is clamped against the end face 48a of the tube 48 by a flanged nut 52 having a threaded connection at 53 with the clamping draw rod 50. The nut 52 may have, projecting into a recess in end face 48a, a hub portion shaped to correspond to the arbor hole of the saw. Tightening by the hand wheel 51 clamps the work piece W to spindle tube 48. To further secure the work blank the spindle tube 47 is split at 54 and a clamp 55 clamps the spindle tube 47 to the tube 48 after the tube 48 with the work blank is slid toward the die mechanism.

Figure 8:
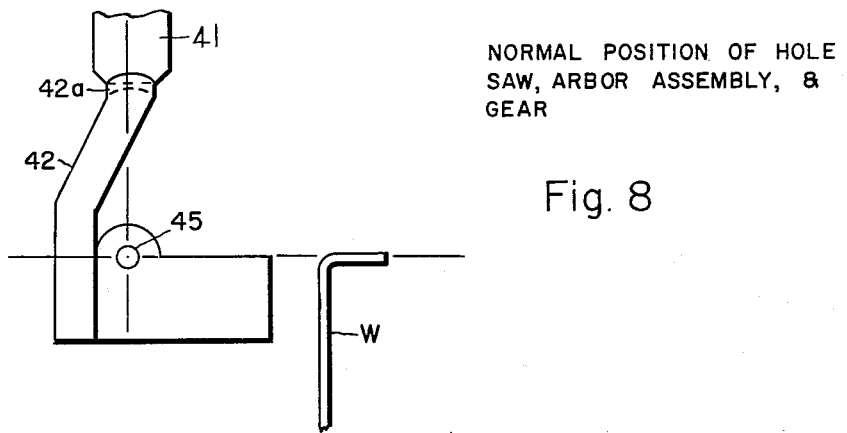
Figs. 8, 9 and 10 are diagrammatic exaggerated representation of the positions of the work blank holding means or arbor.
Figure 9:
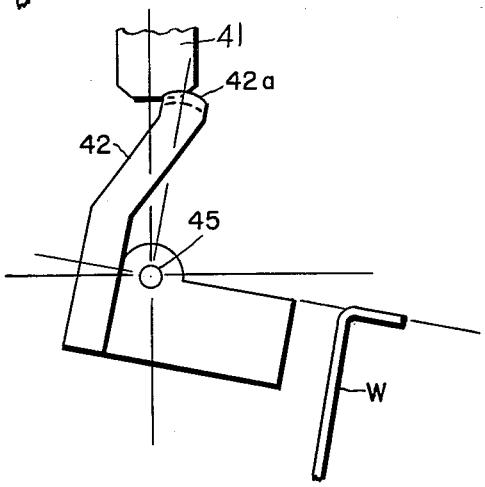
Figure 10:
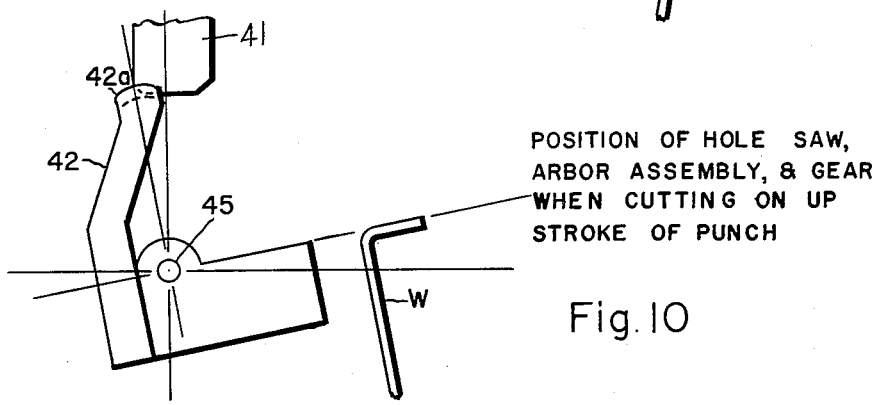

It will be noted that the teeth 42a (Figs. 8, 9 and 10) on the spindle gear 42 are arcuate with the center of the arc radius coincident with the center of the pin 45, thereby to permit the rocking motion of the spindle in a vertical plane including the horizontal axes such as "A" of the conical and cylindrical areas on which the shearing edges lie, as diagrammatically illustrated in Figs. 8, 9 and 10 while affording the described indexing action of the gear 42 which is mounted on the spindle.

One of the advantages of a pivotally mounted rocking spindle is that the center line of the work piece may be disposed relative to the path of the punch (see Figs. 3 and 3A) at such an angle that the punch will clear the lower part of the work piece as shown in Fig. 3A on small diameter work pieces. Hence the depth of the punch structures can be increased in this arrangement, which result is attainable by providing stop blocks (not shown) for positioning the work carrying spindle thereby to define the limits of its rocking movement. The work blank itself can serve to limit the rocking movement when in contact with the dies. Also dies in any case may be in operatively fixed position relatively to each other, as here shown, with the aforementioned die spacing to allow withdrawal of the finished saw, since the blank is free to be moved by the punch against the shearing edges of the dies alternately.

The operation of the apparatus and the fulfillment of the claimed process are apparent from the foregoing description. Either one or two teeth may be shear-formed (with suitable shaped dies and punch members) on the down stroke of the punch, indexing takes place and a like number of teeth are produced on the up stroke of the punch thus using the top and bottom of the punch to produce like formations. On the down stroke a tooth is upset inwardly on the work piece and on the upstroke a tooth is upset outwardly. Any desired number and depth of teeth can be obtained by die and index changes and the entire operation is automatic other than loading and unloading the work pieces from the rocking spindle mechanism, the spindle being manually slidable toward and from the die mechanism, and clamped in operating position by block 55. For single successively oppositely offset teeth, a single punch member would be used, with the lands $22a$, $22a^1$ alone replacing respectively $22b$, $22b^1$ in the dies.

I claim:

1. In a mechanism of the character described an inner and outer die structure, a reciprocating punch structure, said die structures being spaced apart to receive a work blank therebetween, ram means for reciprocating the punch structure past the die structures and the work blank thereby to perform punching operations on a blank, a floatable work holding means for presenting the work blank to the punch and dies and an indexing mechanism synchronized with the movement of the ram means for indexing the work holding means during each half cycle of movement of the ram means.

2. In a mechanism of the character described an inner and an outer arcuate die structure, a reciprocating punch structure, said die structures being spaced apart to receive a cylindrical work blank therebetween, a swingable work blank holding means for supporting the blank between the dies, ram means for reciprocating the punch structure past the die structures and the work blank thereby to perform punching operations on the blank, an indexable mechanism for indexing the work holding means while the work blank is presented to the punch and dies and said indexing mechanism being synchronized with the movement of the ram means for indexing the work holding means.

3. In a machine of the character described a reciprocating ram means, a two way acting punch carried by the ram means, an inner die structure, an outer die structure, the punch alternately cooperating with the inner and the outer die structure to perform work on a work blank disposed between the die structures and a floating work blank holder for permitting the work blank to alternately move toward the respective dies upon reciprocating movement of the two way acting punch.

4. A hole saw tooth forming machine having two spaced apart die structures, a two way acting punch structure having upper and lower tooth forming edges and a swingable work blank holding means for maintaining a work blank juxtaposed to the punch and dies while permitting the blank to alternately float toward the respective die structures whereby the teeth formed by the punch and dies will be alternately offset.

5. In a mechanism of the character described an inner and an outer arcuate die structure, a reciprocating punch structure, said die structures being spaced apart to receive a cylindrical work blank therebetween, ram means for reciprocating the punch structure past the die structures and the work blank at an acute angle to the center line of the cylindrical work piece thereby to perform punching operations on the blank and a floatable work holding means for presenting the work blank to the punch and dies.

6. In a mechanism of the character described an arcuate die structure, a reciprocating punch structure, said die structure being arcuate to receive a cylindrical work blank thereon, ram means for reciprocating the punch structure past the die structure along a path at an acute angle to the center line of the cylindrical work piece thereby to perform punching operations on an edge of the blank, a swingable work holding means for presenting the cylindrical work blank to the punch and die and an indexing mechanism synchronized with the movement of the ram means for indexing the swingable work holding means.

7. In a machine of the character described a reciprocating ram means, a crank shaft for operating the ram, a two way acting punch carried by the ram means, an inner die structure, an outer die structure, the punch alternating by cooperating with the inner and the outer die structure to perform work on a work blank disposed between the die structures, a floating work blank holder for permitting the work blank to alternately move toward the dies upon reciprocating movement of the two way acting punch member and an indexing mechanism including a pair of change gears with one gear on a floating blank holder and the other driven by a Geneva motion means driven by the crank shaft.

8. A hole saw tooth forming machine having two spaced apart die structures, a two way acting punch structure having upper and lower tooth forming edges and a swingable work blank holding means for maintaining a work blank juxtaposed to the punch and dies while permitting the blank to alternately float toward the respective die structures and an indexing mechanism synchronized with the two way action of the punch structure for indexing the work blank holding means.

9. In a hole saw tooth forming machine a tooth punch and die mechanism, a reciprocating ram, a crank shaft for reciprocating the ram, a swingable work blank holder for holding cylindrical work blanks between the punch and die and an intermittently operable indexing mechanism disposed between the crank shaft and swingable work blank holder for intermittently uniformly turning the work blank relative to the reciprocating path of said punch.

10. In a hole saw tooth forming machine a tooth punch and die mechanism, a reciprocating ram, a crank shaft for reciprocating the ram, a work blank holder for holding cylindrical work blanks between the punch and die and an intermittently operable indexing mechanism disposed between the crank shaft and work blank holder for intermittently uniformly turning the work blank relative to the reciprocating path of said punch, said indexing mechanism including a Geneva motion means operated by the crank shaft, a change gear driven by said motion means and a second gear on the work blank holder.

11. In a hole saw tooth forming machine a tooth punch and die mechanism, a reciprocating ram, a crank shaft for reciprocating the ram, a work blank holder for holding cylindrical work blanks between the punch and die and an intermittently operable indexing mechanism disposed between the crank shaft and work blank holder for intermittently uniformly turning the work blank relative to the reciprocating path of said punch, said indexing mechanism including a Geneva motion means operated by the crank shaft, a change gear driven by said motion means and a second gear on the work blank holder, said work blank holder being pivotally mounted on a horizontal axis to permit the work blank to have limited vertical motion and said indexing gear on the holding means being rockable relative to its mating gear.

12. The method of forming cutting teeth on the end of a hollow cylindrical work blank which includes the steps of punching the teeth in pairs with one tooth of the pair formed with the side faces co-incident with the hollow cylindrical shape of the blank and the other tooth of the pair offset relative to said shape and forming a like succeeding pair of teeth with one of the teeth offset in a direction opposite to the said first offset tooth.

13. The method of forming completed saw teeth on cylindrical hole saws comprising the cyclically repeated successive steps of punch shearing one of a series of periodically formed teeth in the end of the cylindrical work piece along a shearing path extending at an acute angle to the axis of the cylindrical work piece, punch shearing one of another series of periodically formed teeth in the opposite direction along a shearing path extending also at an acute angle to the axis of the work piece, but of opposite angular sense to the first said acute angle and intermittently rotating the hole saw blank intermediate each punch shearing action.

References Cited in the file of this patent

UNITED STATES PATENTS

| | | |
|---|---|---|
| 76,147 | Bartholf | Mar. 31, 1868 |
| 1,318,659 | Garrison | Oct. 14, 1919 |
| 1,631,657 | Swett | June 7, 1927 |
| 2,407,821 | Engle | Sept. 17, 1946 |
| 2,510,462 | Christenson | June 6, 1950 |